United States Patent
Jia et al.

(10) Patent No.: US 9,450,664 B2
(45) Date of Patent: Sep. 20, 2016

(54) SPACE-TIME TRANSMIT DIVERSITY SYSTEMS AND METHODS FOR OFDM APPLICATIONS

(75) Inventors: Ming Jia, Ottawa (CA); Wen Tong, Ottawa (CA); Jianglei Ma, Kanata (CA); Peiying Zhu, Kanata (CA); Dong-Sheng Yu, Ottawa (CA)

(73) Assignee: APPLE INC., Cupertino, CA (US)

( * ) Notice: Subject to any disclaimer, the term of this patent is extended or adjusted under 35 U.S.C. 154(b) by 1193 days.

(21) Appl. No.: 11/547,073

(22) PCT Filed: Apr. 4, 2005

(86) PCT No.: PCT/CA2005/000504
§ 371 (c)(1),
(2), (4) Date: Oct. 2, 2006

(87) PCT Pub. No.: WO2005/096519
PCT Pub. Date: Oct. 13, 2005

(65) Prior Publication Data
US 2007/0183527 A1    Aug. 9, 2007

Related U.S. Application Data

(60) Provisional application No. 60/558,566, filed on Apr. 2, 2004, provisional application No. 60/563,802, filed on Apr. 21, 2004, provisional application No. 60/566,009, filed on Apr. 28, 2004.

(51) Int. Cl.
*H04L 1/02* (2006.01)
*H04B 7/06* (2006.01)
(Continued)

(52) U.S. Cl.
CPC .......... *H04B 7/0691* (2013.01); *H04B 7/0669* (2013.01); *H04B 7/0689* (2013.01);
(Continued)

(58) Field of Classification Search
CPC . H04L 1/0618; H04L 1/0643; H04L 1/0688; H04B 7/0669; H04B 7/0697; H04B 7/0891
See application file for complete search history.

(56) References Cited

U.S. PATENT DOCUMENTS 6,185,258 B1    2/2001 Alamouti et al.
6,317,411 B1 *  11/2001 Whinnett et al. ............. 370/204
(Continued)

FOREIGN PATENT DOCUMENTS

CN    1267153    9/2000
CN    1479983    3/2004
(Continued)

OTHER PUBLICATIONS

Kenji Suto and Tomoaki Ohtsuki, "Performance Evaluation of Space-Time-Frequency Block Codes over Frequency Selective Fading Channels", Tokyo University of Science, IEEE 2002.*
(Continued)

*Primary Examiner* — Aristocratis Fotakis
(74) *Attorney, Agent, or Firm* — Fay Kaplun & Marcin, LLP

(57) ABSTRACT

Embodiments of the invention provide orthogonal Frequency Division Multiplexing-Space-time Block Codes (OFDMSTBC) mappings for code rate 1, 2 and 4 codes for 4 Transmit Antennas. To overcome the innate weakness of known codes, a new class of STBC codes is provided which is particularly suited for OFDM applications, although other applications are also contemplated. Codes for STBC mappings in the time direction, the frequency direction and a combined time frequency mapping for multiple antennas are provided. In OFDM applications, these codes exploit the properties of OFDM and FEC codes to substantially maintain the advantages of Alamouti codes. Furthermore, while the detailed examples given herein focus on four antenna applications, they can be easily extended to systems with more than four antennas.

16 Claims, 8 Drawing Sheets

(51) Int. Cl.
*H04B 7/08* (2006.01)
*H04L 1/00* (2006.01)
*H04L 1/06* (2006.01)
*H04L 27/26* (2006.01)

(52) U.S. Cl.
CPC ........... *H04B7/0891* (2013.01); *H04L 1/0069* (2013.01); *H04L 1/0643* (2013.01); *H04L 1/0662* (2013.01); *H04L 1/0668* (2013.01); *H04L 27/2602* (2013.01); *H04L 27/2626* (2013.01); *H04L 27/2647* (2013.01)

(56) References Cited

U.S. PATENT DOCUMENTS

| | | | |
|---|---|---|---|
| 6,594,473 B1* | 7/2003 | Dabak et al. | 455/101 |
| 6,747,959 B1 | 6/2004 | Ho | |
| 2003/0053487 A1 | 3/2003 | Hamalainen et al. | |
| 2003/0067993 A1* | 4/2003 | Viswanathan | 375/267 |
| 2003/0138058 A1 | 7/2003 | Agrawal et al. | |
| 2003/0147343 A1* | 8/2003 | Onggosanusi et al. | 370/209 |
| 2003/0210646 A1 | 11/2003 | Ohseki et al. | |
| 2003/0231706 A1 | 12/2003 | Hwang | |
| 2003/0235149 A1 | 12/2003 | Chan et al. | |
| 2005/0041751 A1* | 2/2005 | Nir et al. | 375/267 |
| 2005/0078761 A1* | 4/2005 | Hottinen et al. | 375/267 |
| 2005/0105629 A1* | 5/2005 | Hottinen et al. | 375/261 |
| 2005/0141494 A1* | 6/2005 | Hottinen et al. | 370/369 |
| 2005/0181737 A1* | 8/2005 | Kobayashi et al. | 455/69 |
| 2005/0255805 A1* | 11/2005 | Hottinen | 455/8 |
| 2006/0039500 A1* | 2/2006 | Yun | H04L 1/0606 375/299 |
| 2006/0078063 A1* | 4/2006 | Hottinen | 375/267 |
| 2006/0093057 A1* | 5/2006 | Zhang et al. | 375/267 |

FOREIGN PATENT DOCUMENTS

| | | |
|---|---|---|
| EP | 1 043 861 | 10/2000 |
| EP | 1 182 799 A2 | 2/2002 |
| WO | 02/43314 | 5/2002 |

OTHER PUBLICATIONS

Gang Wu and Shixin Cheng, "Space-Time Transmit Diversity with Antenna Hopping over Flat-Fading Channels", Philips Research East Asia, 2003 IEEE.*

Mattias Wennstrom, Branislav Popovic Huawei, "Closed-Loop Precoding for STC", IEEE C802.16e-04/451r1, Nov. 12, 2004.*

Jafarkhani, H., "A Quasi-Orthogonal Space-Time Block Code", IEEE Transactions on Communications, vol. 49, Issue 1, Jan. 2001, pp. 1-4.

Tirkonnen et al., "Square-Matrix Embeddable Space-Time Block Codes for Complex Signal Constellations", IEEE Transactions on Information Theory, vol. 48, Issue 2, Feb. 2002, pp. 384-395.

Tarokh et al., "Space-Time Block Codes from Orthogonal Designs", IEEE Transactions on Information Theory, vol. 45, Issue 5, Jul. 1999, pp. 1456-1467.

Rouquette-Leveil, S. et al., "Spatial division multiplexing of space-time block codes", Communication Technology Proceedings, Apr. 9-11, 2003, IEEE, vol. 2, pp. 1343-1347.

Gang, Wu et al., "Space-time transmit diversity with antenna hopping over flat-fading channels", Personal, Indoor and Mobile Radio Communications, 2003 PIMRC, 14th IEEE Proceedings on Sep. 7-10, 2003, IEEE, vol. 2, pp. 1312-1316.

Suto, K. et al., "Performance evaluation of space-time-frequency block codes over frequency selective fading channels", VTC 2002-Fall, 2002 IEEE 56th, Vehicular Technology Conference Proceedings, Sep. 24-28, 2002, vol. 3, pp. 1466-1470.

Tirkkonen, O. et al., "Square-matrix embeddable space-time block codes for complex signal constellations", IEEE Transactions on Information Theory, IEEE Press, vol. 48, No. 2, Feb. 1, 2002, pp. 384-395.

Siavash, M. Alamouti, "A Simple Transmit Diversity Technique for Wireless Communications", IEEE Journal on Selected Areas in Communications, IEEE Service Center, vol. 16, No. 8, Oct. 1, 1998.

Supplementary Search Report for corresponding European Patent Application No. 05729969.5, Apr. 4, 2012, 5 pages.

Eklund C et al: "IEEE Standard 802. 16: A Technical Overview of the Wirelessman Air Interface for Broadband Wireless Access", IEEE Communication Magazine, IEEE Service Center, Piscataway. US, vol. 40, No. 6, Jun. 1, 2002, pp. 98-107, XP001123517, ISSN: 0163-6804, DOI: 10.1109/ MCOM. 2002. 1007415.

"Enhanced MAC Support for MIMO OFDMA; C80216e-04_99r1", IEEE Draft: C80216E-04_96R1, IEEE-SA, Piscataway, NY USA, vol. 802. 16e,May 19, 2004, pp. 1-7, XP017623817.

* cited by examiner

SPACE-TIME TRANSMIT DIVERSITY SYSTEMS AND METHODS FOR OFDM APPLICATIONS

RELATED APPLICATIONS

This application claims the benefit of PCT Application No. PCT/CA2005/000504 filed Apr. 4, 2005. This application claims the benefit of U.S. Provisional Patent Application No. 60/558,566 filed on Apr. 2, 2004, U.S. Provisional Patent No. 60/563,802 filed on Apr. 21, 2004, and U.S. Provisional Patent Application No. 60/566,009 filed on Apr. 28, 2004.

FIELD OF THE INVENTION

The invention relates to space-time transmit diversity systems and methods for OFDM (orthogonal frequency division multiplexing) applications.

BACKGROUND OF THE INVENTION

For open-loop fading channels, diversity is often considered the only choice to mitigate the fading effects and improve the system reliability. While FEC (forward error correction) coding provides valuable time diversity, for a slow fading environment, space diversity/polarization proves to be more effective. The objective of the so-called space-time codes is to maximize the diversity gain.

There are basically two kinds of space-time codes: trellis codes and block codes. While trellis codes provide additional coding gain, they have drawbacks, namely: the decoder is more complex (since these codes work on the QAM symbols), and it is difficult to concatenate trellis space-time codes with powerful soft-decoding FEC codes, such as Turbo codes and convolutional codes. Space-time block codes (STBC) do not provide coding gain, but they are simple to decode (especially for those complex orthogonal design codes), and they can be naturally combined with other soft-decoding FEC codes. It is for these reasons that STBC (space-time block codes) are more practical and are widely adopted by numerous standards.

The best known STBC code was invented by Alamouti and Tarokh (U.S. Pat. No. 6,185,258) where the code matrix is presented as in Table 1 below.

TABLE 1

The Alamouti code

|  | Time t | Time (t + T) |
|---|---|---|
| Antenna 1 | $s_1$ | $s_2$ |
| Antenna 2 | $-s_2^*$ | $s_1^*$ |

This code has several properties, which makes it perfect for space diversity. The signals are orthogonal; hence full diversity is achieved at the receiver side. The transmit power is balanced between the two antennas (and the two time slots); hence a low cost power amplifier can be used, which in turn reduces the modem cost. Its code rate is 1; hence no throughput is sacrificed. Its maximum likelihood decoder is very simple, which makes the cost of an optimal decoder negligible.

Unfortunately, it was proven later that there are no such orthogonal codes existing for a system with more than two transmitter antennas. Therefore, the focus was shifted to the following two areas: designing orthogonal STBC codes with a code rate smaller than 1; and designing quasi-orthogonal STBC codes to maintain the property of code rate 1. While the first approach sacrifices the system throughput, the second approach sacrifices signal quality due to a loss of orthogonality.

There are several variations of the codes falling into the above categories, with focus on other areas such as power balancing and code rate manipulation; but no codes with the beauty of the Alamouti have been found.

Table 2 below is a first example of an STBC code for 4 transmit antennas (code-A). This is an orthogonal code having code rate 3/4. This code strives to maintain the orthogonality of the codes, thereby the diversity order and signal quality.

TABLE 2

Code rate 3/4 orthogonal code (Code-A)

|  | Time t | Time (t + T) | Time (t + 2T) | Time (t + 3T) |
|---|---|---|---|---|
| Antenna 1 | $s_1$ | $-s_2^*$ | $-s_3^*$ | x |
| Antenna 2 | $s_2$ | $s_1^*$ | x | $s_3^*$ |
| Antenna 3 | $s_3$ | x | $s_1^*$ | $-s_2^*$ |
| Antenna 4 | x | $-s_3$ | $s_2$ | $s_1$ |

With this code, each received signal has a diversity order of 4. However, one weakness of this code is its code rate loss, which must be compensated in FEC codes. In other words, due to the rate loss in STBC, the code rate in FEC must be higher. This can cause problem for those powerful trellis codes at higher code rate, whose coding gain loss becomes significant when punctuation becomes excessive. Note that this code does not achieve full power balance across transmit antennas. There are other codes available that are able to overcome this weakness.

Table 3 contains a second example of an STBC code for 4 antenna applications (Code-B). This is a code rate 1 non-orthogonal code. This code strives to maintain the throughput of the system; thereby no coding gain will be lost at the FEC stage.

TABLE 3

Code rate 1 non-orthogonal code (Code-B)

|  | Time t | Time (t + T) | Time (t + 2T) | Time (t + 3T) |
|---|---|---|---|---|
| Antenna 1 | $s_1$ | $-s_2^*$ | $s_3$ | $-s_4^*$ |
| Antenna 2 | $s_2$ | $s_1^*$ | $s_4$ | $s_3^*$ |
| Antenna 3 | $s_3$ | $-s_4^*$ | $s_1$ | $-s_2^*$ |
| Antenna 4 | $s_4$ | $s_3$ | $s_2$ | $s_1^*$ |

Since code-B is no longer an orthogonal code, its determinant suffers from mutual interference. Defining the equivalent channel matrix Q as $$Q = \begin{bmatrix} h_1 & h_2 & h_3 & h_4 \\ h_2^* & -h_1^* & h_4^* & -h_3^* \\ h_3 & h_4 & h_1 & h_2 \\ h_4^* & -h_3^* & h_2^* & -h_1^* \end{bmatrix}, \quad (1)$$

then $$\vec{r} = Q\vec{s}, \quad (2)$$

where $\bar{r}=[r_1\ r^*_2\ r_3\ r^*_4]^T$, and $\bar{s}=[s_1\ s_2\ s_3\ s_4]^T$. The determinant of Q is given by $$|Q|=A^2-B^2, \qquad (3)$$

where $A=|h_1|^2+|h_2|^2+|h_3|^2+|h_4|^2$, and $B=2(\text{Re}(h_1h^*_3)+\text{Re}(h_2h_4))$. The element of $B^2$ represents the loss due to the loss of orthogonality. Since $B^2 \geq 0$, it always contributes negatively to the code performance.

SUMMARY OF THE INVENTION

According to an aspect of the present invention, there is provided a method for mapping a rate one space-time block code for a 2 n antenna transmitter where n>=2, the method comprising transmitting 2 n transmission symbols by; during n pairs of consecutive transmission intervals, transmitting a respective Alamouti code block containing two transmission symbols on a respective pair of antennas such that all antennas are used during the n pairs of consecutive transmission intervals and only one pair of antennas is active during a given transmission interval.

According to another aspect of the present invention, there is provided a method for mapping a rate one space-time block code for a 2 n antenna transmitter where n>=2, the method comprising transmitting 2 n transmission symbols on each sub-carrier of a plurality of sub-carriers in an OFDM spectrum by; for each transmission interval: on each of n pairs of adjacent OFDM sub-carriers, transmitting a respective Alamouti code block containing two transmission symbols on a respective pair of antennas such that all sub-carriers are used and only one pair of antennas is active during a given transmission interval for a given sub-carrier.

According to another aspect of the present invention, there is provided a method for mapping a space-time blocks code for a 2 n antenna transmitter where n>=2, the method comprising transmitting 2 n transmission symbols by: during two consecutive transmission intervals, transmitting a respective Alamouti code block containing two transmission symbols on a respective pair of antennas.

According to another aspect of the present invention, there in provided a method for mapping a space-time block code for a 2 n antenna transmitter where n>=2, the method comprising transmitting 2 n transmission symbols by: for each transmission interval; on a pair of adjacent OFDM sub-carriers, transmitting a respective Alamouti code block containing two transmission symbols on a respective pair of antennas.

According to another aspect of the present invention, there is provided a method for mapping a space-time block code for a 2 n+1 antenna transmitter where n>=1, the method comprising transmitting transmission symbols by: during k pairs of consecutive transmission intervals, transmitting a respective Alamouti code block containing two transmission symbols on a respective pair of antennas such that all antennas are used during at least one of the k pairs of consecutive transmission intervals and at least one transmit antenna is used during two of the k pairs of consecutive transmission intervals.

According to another aspect of the present invention, there is provided a method for mapping a space-time block code for a 2 n+1 antenna transmitter where n>=1 adapted to transmit transmission symbols by; for each transmission interval: on k pairs of sub-carriers, transmitting a respective Alamouti code block containing two transmission symbols on a respective pair of antennas such that all antennas are used during at least one of the k pairs of consecutive transmission intervals and at least one transmit antenna is used during two of the k pairs of sub-carriers.

According to another aspect of the present invention, there is provided a method for mapping a space-time block code for a 4 antenna transmitter, the method comprising selecting an appropriate code rate code from a code set of available code rate codes, wherein the code set is:

|  |  | Time t | Time (t + T) | Time (t + 2T) | Time (t + 3T) |
|---|---|---|---|---|---|
| Code Rate = 1 | Antenna 1 | $s_1$ | $-s_2^*$ | 0 | 0 |
|  | Antenna 2 | $s_2$ | $s_1^*$ | 0 | 0 |
|  | Antenna 3 | 0 | 0 | $s_3$ | $-s_4^*$ |
|  | Antenna 4 | 0 | 0 | $s_4$ | $s_3^*$, |

|  |  | Time t | Time (t + T) | Time (t + 2T) | Time (t + 3T) | Time (t + 4T) | Time (t + 5T) |
|---|---|---|---|---|---|---|---|
| Code Rate = 2 | Antenna 1 | $s_1$ | $-s_2^*$ | $s_5$ | $-s_7^*$ | $s_9$ | $-s_{12}^*$ |
|  | Antenna 2 | $s_2$ | $s_1^*$ | $s_6$ | $-s_8^*$ | $s_{10}$ | $-s_{11}^*$ |
|  | Antenna 3 | $s_3$ | $-s_4^*$ | $s_7$ | $s_5^*$ | $s_{11}$ | $s_{10}^*$ |
|  | Antenna 4 | $s_4$ | $s_3^*$ | $s_8$ | $s_6^*$ | $s_{12}$ | $s_9^*$ | or

|  |  | Time t | Time (t + T) | Time (t + 2T) | Time (t + 3T) |
|---|---|---|---|---|---|
| Code Rate = 4 | Antenna 1 | $s_1$ | $s_5$ | $s_9$ | $s_{13}$ |
|  | Antenna 2 | $s_2$ | $s_6$ | $s_{10}$ | $s_{14}$ |
|  | Antenna 3 | $s_3$ | $s_7$ | $s_{11}$ | $s_{15}$ |
|  | Antenna 4 | $s_4$ | $s_8$ | $s_{12}$ | $s_{16}$ |

According to another aspect of the present invention, there is provided a method for mapping a space-time block code for a 4 antenna transmitter, the method comprising selecting an appropriate code rate code from a code set of available code rate codes, wherein the code set is:

|  |  | Sub-carrier k | Sub-carrier k + 1 | Sub-carrier k + 2 | Sub-carrier k + 3 |
|---|---|---|---|---|---|
| Code Rate = 1 | Antenna 1 | $s_1$ | $-s_2^*$ | 0 | 0 |
|  | Antenna 2 | $s_2$ | $s_1^*$ | 0 | 0 |
|  | Antenna 3 | 0 | 0 | $s_3$ | $-s_4^*$ |
|  | Antenna 4 | 0 | 0 | $s_4$ | $s_3^*$, |

|  |  | Sub-carrier k | Sub-carrier k + 1 | Sub-carrier k + 2 | Sub-carrier k + 3 | Sub-carrier k + 4 | Sub-carrier k + 5 |
|---|---|---|---|---|---|---|---|
| Code Rate = 2 | Antenna 1 | $s_1$ | $-s_2^*$ | $s_5$ | $-s_7^*$ | $s_9$ | $-s_{12}^*$ |
|  | Antenna 2 | $s_2$ | $s_1^*$ | $s_6$ | $-s_8^*$ | $s_{10}$ | $-s_{11}^*$ |
|  | Antenna 3 | $s_3$ | $-s_4^*$ | $s_7$ | $s_5^*$ | $s_{11}$ | $s_{10}^*$ |
|  | Antenna 4 | $s_4$ | $s_3^*$ | $s_8$ | $s_6^*$ | $s_{12}$ | $s_9^*$ | or

|  |  | Sub-carrier k | Sub-carrier k + 1 | Sub-carrier k + 2 | Sub-carrier k + 3 |
|---|---|---|---|---|---|
| Code Rate = 4 | Antenna 1 | $s_1$ | $s_5$ | $s_9$ | $s_{13}$ |
|  | Antenna 2 | $s_2$ | $s_6$ | $s_{10}$ | $s_{14}$ |
|  | Antenna 3 | $s_3$ | $s_7$ | $s_{11}$ | $s_{15}$ |
|  | Antenna 4 | $s_4$ | $s_8$ | $s_{12}$ | $s_{16}$ |

According to another aspect of the present invention, there is provided a method for mapping a rate 3/4 space-time block code for a 4 antenna transmitter, the method comprising transmitting 3 transmission symbols by: during a pair of consecutive transmission intervals, transmitting a respective Alamouti code block containing two transmission symbols on a first respective pair of antennas on a given sub-carrier and transmitting a respective Alamouti code block containing one transmission symbol on a second respective pair of antennas on a same sub-carrier such that all antennas are used during the pair of consecutive transmission intervals.

According to another aspect of the present invention, there is provided a method for mapping a rate one space-time block code for a 2 n antenna transmitter where n>=2, the method comprising transmitting 2 n transmission symbols by: during a pair of consecutive transmission intervals, transmitting a respective Alamouti code block containing two transmission symbols on a respective pair of antennas on a given sub-carrier such that all antennas are used during the pair of consecutive transmission intervals and each pair of antennas is active on a different sub-carrier.

According to another aspect of the present invention, there is provided a method for mapping a rate one space-time block code for a 2 n antenna transmitter where n>=2, the method comprising transmitting 4 n transmission symbols by: during a pair of consecutive transmission intervals, transmitting a respective Alamouti code block containing n transmission symbols on a respective pair of antennas on a given sub-carrier such that all antennas are used during the pair of consecutive transmission intervals.

According to another aspect of the present invention, there is provided a method of transmitting a MIMO OFDM signal expressed in the form Y=HF(S), where $Y^{1 \times M}$ is an output of a MIMO channel, $H^{M \times NT}$ is a matrix of MIMO channel characteristics, F(s) denotes a space-time coding matrix for a complex input symbol s=[$s_1$ $s_2$ ... $s_L$] which is grouped as $s_1$=[$s_1$ $s_2$ $s_3$ $s_4$], $s_2$=[$s_5$ $s_6$ $s_7$ $s_8$] and $s_3$=[$s_9$ $s_{10}$ $s_{11}$ $s_{12}$], the method comprising selecting an appropriate code for a wireless terminal adapted to receive the MIMO OFDM signal transmitted by a multi-antenna transmitter depending on a number of receiver antenna at the wireless terminal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which:

FIG. 1B—A schematic diagram of a multi-antenna transmitter and receiver supporting MIMO-OFDM communication for use with embodiments provided by the invention;

FIG. 1C—A schematic diagram of another multi-antenna transmitter supporting MIMO-OFDM communication for use with embodiments provided by the invention;

FIG. 1D—A schematic diagram of a further multi-antenna transmitter supporting MIMO-OFDM communication for use with embodiments provided by the invention;

FIG. 1E—A schematic diagram of yet another multi-antenna transmitter supporting MIMO-OFDM communication for use with embodiments provided by the invention;

DETAILED DESCRIPTION OF THE PREFERRED EMBODIMENTS

In accordance with embodiments of the invention, methods are provided for mapping users to a multi-antenna transmit resource that enables the network to exploit the time-frequency diversity and multi-user diversity. In addition, the mapping also allows flexible radio resource management/allocation and provides different QoS based services. Within the same framework, SISO, MISO, MIMO capable users can be supported.

By way of overview, each user can be mapped onto a different OFDM resource which might be a sub-channel, e.g. the AMC sub-channel and/or a diversity sub-channel. For MIMO users, preferably, multiple different space-time coding schemes are supported such as SM (spatial multiplexing) and STTD(space-time transmit diversity).

On a continuous basis, there is a stream of OFDM symbols associated with each transmit antenna. Each user may be first mapped onto one or multiple OFDM symbols and each OFDM symbol may then be mapped onto its associated antenna. Such mapping also allows per-antenna rate control (PARC) to be performed in some embodiments.

Each OFDM symbol may be mapped onto its associated antenna in the sub-carrier domain. For certain sub-carriers, if no specific user data is mapped, then a null assignment to such sub-carrier maybe fed into the corresponding antenna.

Figure 1A:
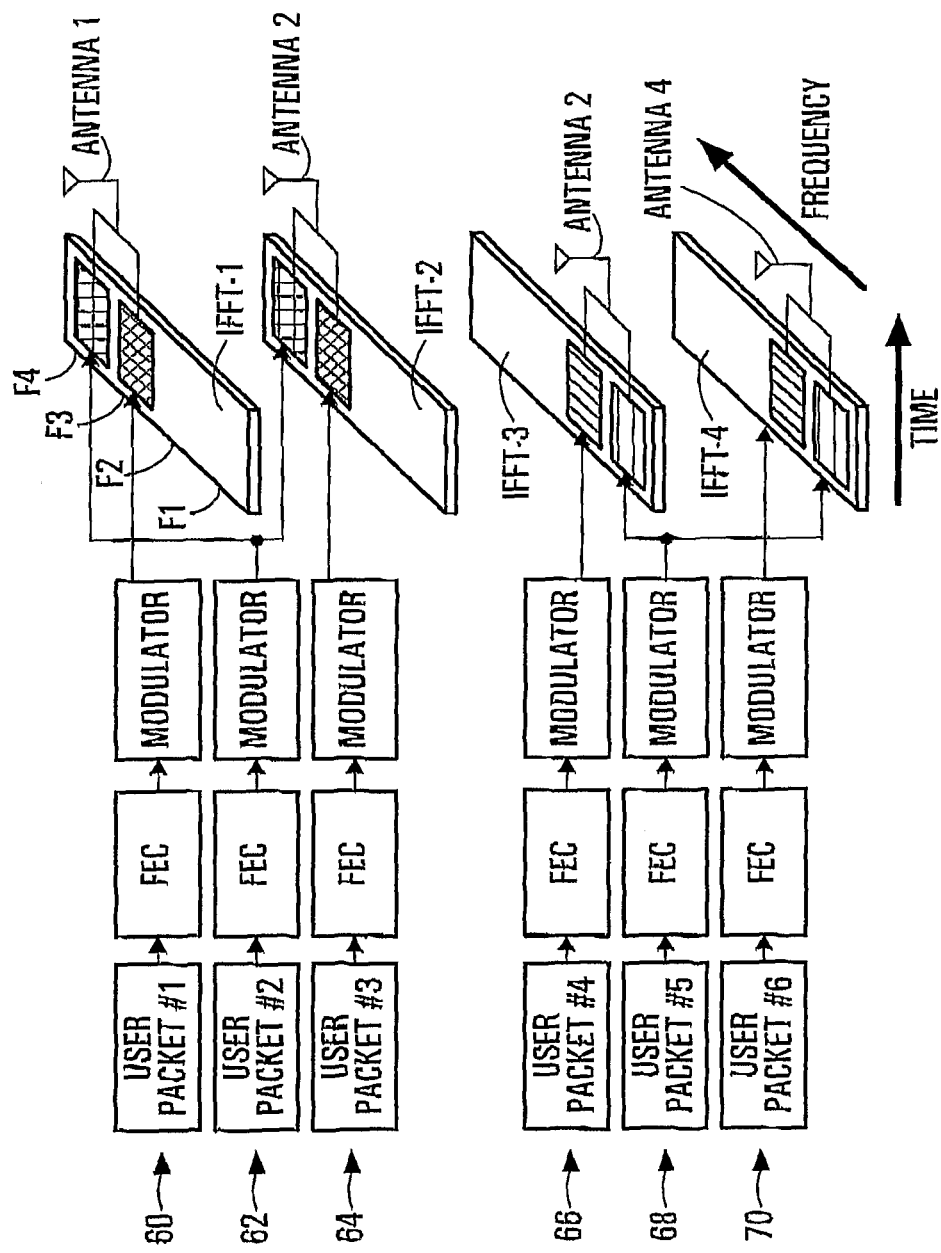
FIG. 1A—A schematic diagram of a 4 antenna transmitter supporting MIMO-OFDM communication for use with embodiments provided by the invention.

A very simple example of what might be transmitted at a specific instant in time as a result of a particular OFDM symbol and antenna mapping is shown in FIG. 1A. FIG. 1A shows a four antenna transmit system that, in the instance depicted, is being used to transmit six user packets 60, 62, 64, 66, 68, 70 each of which undergoes FEC (forward error correction) and modulation. A specific mapping of the six packets of six users is shown for a particular time instant. Over time, the number of users, and/or the manner in which the user packets are mapped are preferably dynamically changing.

For the particular time instant, the OFDM bandwidth is allocated in four distinct frequency bands F1, F2, F3, F4. These might for example be considered AMC sub-channels. A similar approach can be employed for diversity sub-channels.

Each packet is to be mapped onto the four antennas using a selected mapping scheme. Various space-time mapping schemes are described in detail below. In some embodiments, multiple different schemes are available or a given number of transmit antennas and receive antennas. For example, for a 2×2 system, preferably STTD or SM (BLAST—Bell Labs Layer Space Time) can be selected. In other embodiments only a single scheme is implemented for each antenna permutation. Single antenna users use a single input single output (SISO) (which may involve PARC—Per-antenna rate control) transmission scheme.

The first packet 60 is transmitted using only antenna 1 on band F3 implying a 1×1 SISO transmission.

The second packet 62 is transmitted on both antennas 1 and 2 in band F4 implying a 2×1, 2×2 or 2×4 MIMO transmission.

The third packet 64 is transmitted only on antenna 2 in band F3, again implying a 1×1 SISO transmission.

The fourth packet 66 is transmitted on band F2 over antenna 3.

The fifth packet 68 is transmitted on band F1 on both of antennas 3 and 4.

Finally, packet 70 is transmitted on only band F2 of antenna 4.

Generally, each packet can be mapped individually to some or all of the antennas. This enables MIMO and non-MIMO users to be mixed. In the above example, packets 60, 64, 66 and 70 are for non-MIMO users. Packets 62 and 64 are for MIMO users.

Please note that the flexible mapping of MIMO and non-MIMO users applied both in the context of "partial utilization" and "full utilization". With partial utilization, a given base station only has access to part of the overall OFDM band. In this case, the sub-bands F1, F2, F3, F4 defined for the example of FIG. 1A would fall within the defined part of the overall band. With partial utilization, different base stations that are geographically proximate may be assigned different bands. With full utilization, each base station uses the entire OFDM band. With such an implementation, for the particular example of FIG. 1A the sub-bands F1, F2, F3, F4 would map to the entire band.

For SISO users, a single band on a single antenna will be used. For a MIMO user the configuration is denoted as $N_T \times N_R$.

The flexible structure illustrated by way of example in FIG. 1A can be used for both STTD and BLAST, For example, the packet 62 may be transmitted using the band F4 on antennas 1 and 2 using either BLAST or STTD.

The particular example shown in FIG. 1A is designed to show the co-existence of SISO and MIMO be it STTD and/or BLAST. Of course the number of sub-bands, and their shape, size, location, etc., within the OFDM band are implementation specific details. The mapping can be done on a per OFDM symbol basis, or for multiple OFDM symbols.

Details of a method of performing transmitting from a plurality of antennas are defined in applicants' co-pending U.S. application Ser. No. 11/547,077 hereby incorporated by reference in its entirety. The method generally involves:

dividing an available OFDM bandwidth of each antenna into sub-channels;

defining a plurality of regions, each region being defined by a respective set of sub-channels and a defined number of OFDM symbols;

defining a respective antenna mapping for each region and selecting one or more of the plurality of antennas to use for the region, the antenna mappings including at least one MIMO mapping;

mapping content for at least one user to each of the regions using the respective antenna mapping;

transmitting each region on the one or more antennas selected for the region.

Another way to think of this is that each time-frequency block that is defined can have its own matrix. Once the matrix is specified, the number of antennas at the output is defined. For example, a 2×2 matrix requires two antennas; a 4×4 matrix requires four antennas. The matrix also determines, not necessarily uniquely, the number of different users that can be mapped. Particular examples are given in the tables below.

The content for multiple users of course needs to be mapped in a manner that is consistent and non-conflicting. Also, each user needs to be informed of where/when its content will be transmitted.

For each individual user, the antenna mapping enables STTD, SM and PARC transmissions for either the AMC sub-channel or the diversity sub-channel. In one embodiment, any one of six different mapping configurations can be applied to each individual user there including three 4-transmit antenna mappings, 2-transmit antenna mappings and a single antenna mapping.

The uplink may include, for example, two modes: (1) STTD for dual transmit antenna capable SS and (2) Virtual-MIMO for single transmit antenna capable SS.

Referring now to FIGS. 1B, 1C, 1D and 1E shown are specific transmitter configurations. In a preferred embodiment, the transmitter is dynamically reconfigurable to enable transmission to multiple users using respective transmission formats. The particular examples of FIGS. 1B, 1C, 1D, and 1E below can be considered "snapshots" of such a reconfigurable transmitter. These configurations can also exist simultaneously for different sub-bands of an overall OFDM band that is being employed. For example, the configuration of FIG. 1B might be used for a first set of sub-channels or a first OFDM band and associated user(s); the configuration of FIG. 1C might be used for a second set of sub-channels or a second OFDM band and associated user(s) and so on. Of course, many of the components that are shown as being replicated would not need to be physically replicated. For example, a single IFFT and associated transmit circuitry can be used per antenna with the different mappings being performed and then input to appropriate sub-carriers of the IFFT.

Figure 1B:
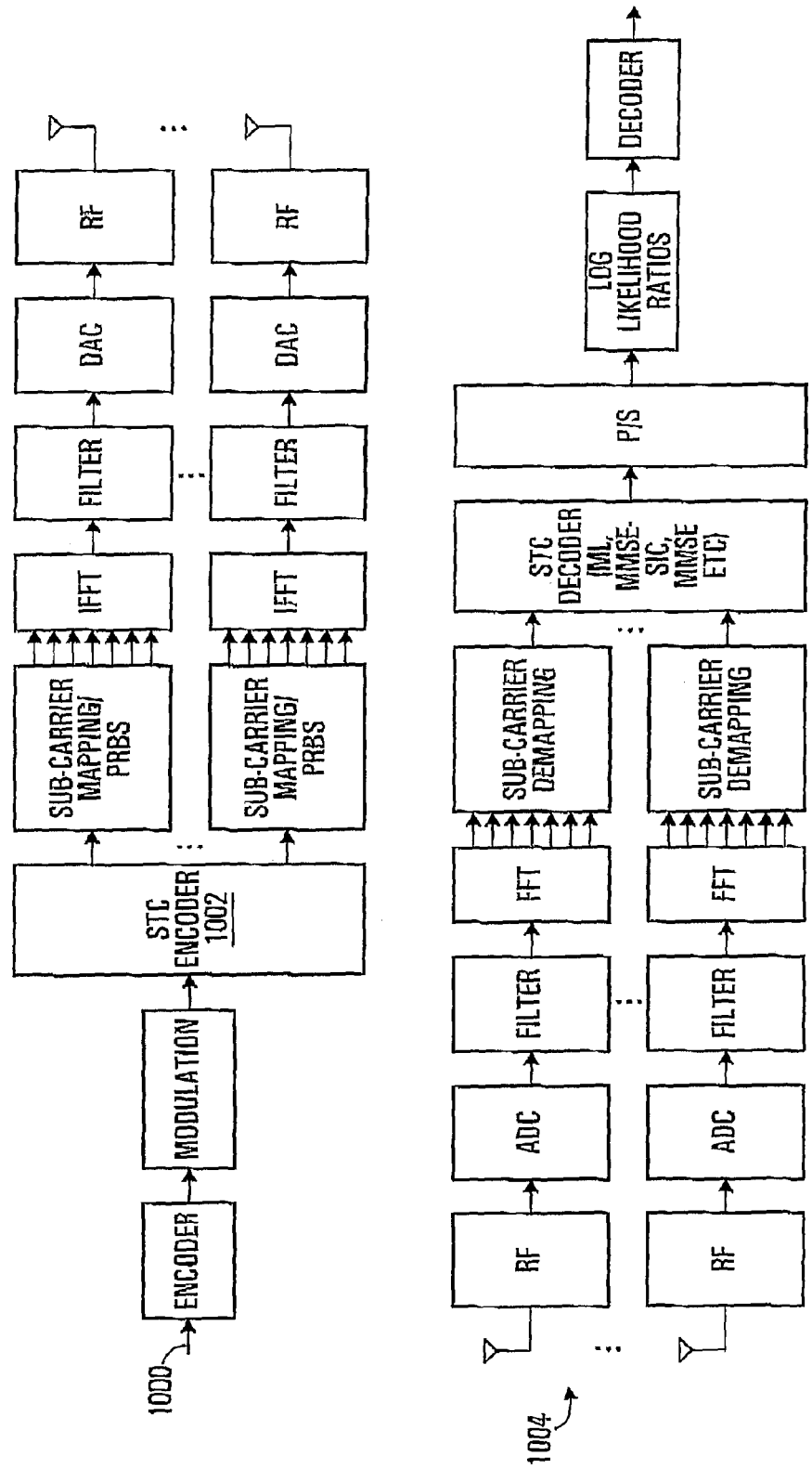

FIG. 1B shows an example configuration with a matrix that performs STTD encoding based on a single input stream, and with horizontal encoding for two, three or four transmit antennas. An input stream 1000 is encoded and modulated and then STC encoded in space time encoder 1002 having two, three or four outputs that are then fed to respective transmit chains and transmitted. A corresponding receiver structure is indicated generally at 1004. In this case, matrix $F_{4\times1}$ or $F_{4\times2}$ defined below can be used for four transmit antennas, depending upon receiver capabilities, or $F_{2\times1}$ defined below can be used for two transmit antennas. These are all STTD matrices, that might for example be employed; other matrices are possible.

Figure 1C:
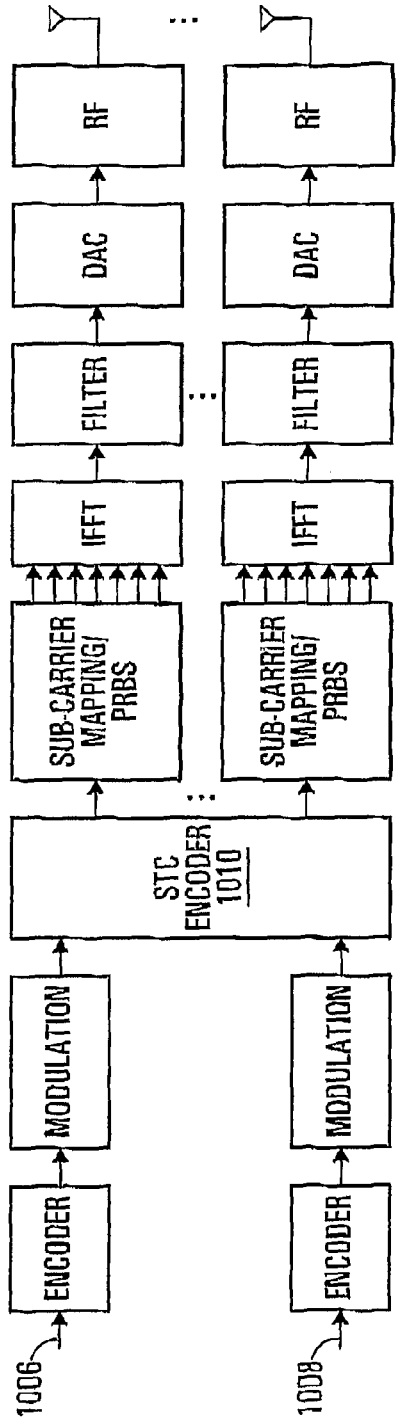

FIG. 1C shows an example configuration with a matrix that performs STTD encoding for multiple input streams, and with horizontal encoding for two, three or four transmit antennas. Input streams 1006, 1008 (only two shown, more possible) are encoded and modulated and then STC encoded in space time encoder 1010 having two, three or four outputs that are then fed to respective transmit chains and transmitted. In this case, matrix $F_{4\times1}$ or $F_{4\times2}$ defined below can be used for four transmit antennas, depending upon receiver capabilities, or $F_{2\times1}$ defined below can be used for two transmit antennas. These are all STTD matrices, that might for example be employed; other matrices are possible.

Figure 1D:
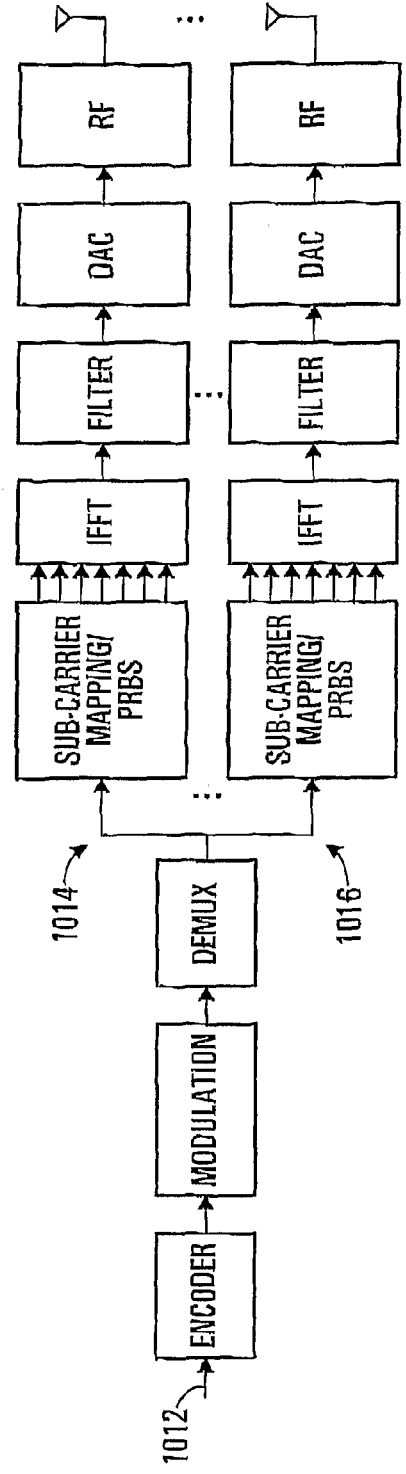

FIG. 1D shows an example configuration with a matrix that performs SM (e.g. BLAST) encoding for a single input stream. Input stream 1012 is encoded and modulated and then demultiplexed into two, three or four streams 1012, 1014 that are fed to respective transmit chains and transmitted. In this case, matrix $F_{4\times4}$ might be used for four transmit antennas or $F_{2\times2,2\times4}$ for two transmit antennas, both defined below, both of which are SM matrices, that might for example be employed; other matrices are possible. This is an example of so-called "vertical encoding" where the input symbols of a given input stream are vertically distributed (i.e. simultaneous in time) between the multiple antennas.

Figure 1E:
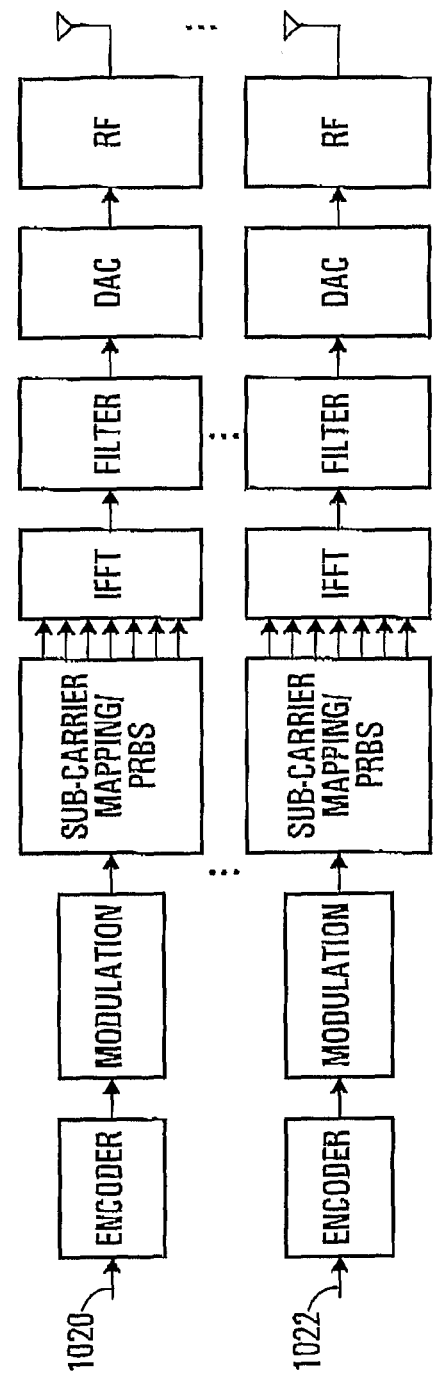

FIG. 1E shows an example configuration with a matrix that performs SM (e.g. BLAST) encoding for multiple input streams. Input streams 1020, 1022 (only two shown, more possible) are encoded and modulated fed to respective transmit chains and transmitted. In this case, matrix $F_{4\times4}$ might be used for four transmit antennas or $F_{2\times2,\ 2\times4}$ for two transmit antennas, both defined below, both of which are SM matrices, that might for example be employed; other matrices are possible. This is an example of so-called "horizontal encoding" where the input symbols of a given input stream are horizontally distributed (i.e. sequentially in time) on a single antenna.

Specific Antenna Mapping Example

A more specific example of a quasi-orthogonal Space-Time Coding Flexible mode Assignment for SISO, STTD and SM based on the above will now be detailed.

Downlink open loop transmission with multiple antennas at a base station (BS) can be configured by several transmission modes. Assuming that $N_T$ is the number of transmit antennas at the BS and $N_R$ is the number of receive antennas at a terminal subscriber station (SS), a MIMO configuration is denoted as $N_T \times N_R$. Note that for SISO transmissions only one of the available transmit antennas is used. Any existing SISO code structure can be employed.

| Index | 1 | 2 | 3 | 4 | 5 |
|---|---|---|---|---|---|
| FEC | R = ⅕ | R = ⅓ | R = ½ | R = ⅔ | R = ⅘ |
| Modulation | QPSK | 16 QAM | 64 QAM | | |

For MIMO down link transmission, space-time coding is preferably employed. In one embodiment, a 4×4 quasi-orthogonal space-time transmit diversity (QOSTTD) code is used as a mother code for space-time coding, and can be punctured in time to optimize for different receive antenna configurations. The MIMO transmission and reception can be expressed by $Y=HF(S)$, where $Y^{1\times M}$ is the output of the MIMO channel, $H^{M\times NT}$ is a matrix of MIMO channel characteristics, F(s) denotes the space-time coding matrix for a complex input symbol $s=[s_1\ s_2\ \ldots\ s_L]$ which is grouped as $s_1=[s_1\ s_2\ s_3\ s_4]$, $s_2=[s_5\ s_6\ s_7\ s_8]$ and $s_3=[s_9\ s_{10}\ s_{11}\ s_{12}]$, and the rows of coding matrix F(s) are the individual antenna transmission outputs.

A code suitable for a 4×1 configuration is: (STC Code Rate=1)

$$F_{4\times1}(S_1, S_2, S_3) = \begin{bmatrix} s_1 & -s_2^* & -s_3^* & s_4 & s_5 & -s_7^* & -s_8^* & s_6 & s_9 & -s_{12}^* & -s_{10}^* & s_{11} \\ s_2 & s_1^* & -s_4^* & -s_3 & s_6 & s_8^* & s_7^* & s_5 & s_{10} & -s_{11}^* & s_9^* & -s_{12} \\ s_3 & -s_4^* & s_1^* & -s_2 & s_7 & s_5^* & -s_6^* & -s_8 & s_{11} & s_{10}^* & s_{12}^* & s_9 \\ s_4 & s_3 & s_2^* & s_1 & s_8 & -s_6^* & s_5^* & -s_7 & s_{12} & s_9^* & -s_{11}^* & -s_{10} \end{bmatrix}.$$

A code suitable 4×2 configuration (STC Code Rate=2, STTD), in-time puncturing the columns 3&4, 7&8 and 11&12 of $F_{4\times2}(S_1, S_2, S_3)$ gives:

$$F_{4\times2}(S_1, S_2, S_3) = \begin{bmatrix} s_1 & -s_2^* & s_5 & -s_7^* & s_9 & -s_{12}^* \\ s_2 & s_1^* & s_6 & s_8^* & s_{10} & -s_{11}^* \\ s_3 & -s_4^* & s_7 & s_5^* & s_{11} & s_{10}^* \\ s_4 & s_3 & s_8 & -s_6^* & s_{12} & s_9^* \end{bmatrix}.$$

A code suitable for a 4×4 configuration (STC Code Rate=4, spatial multiplexing), columns 1, 3 and 5 of $F_{4\times2}(S_1, S_2, S_3)$, are preferably punctured, gives:

$$F_{4\times4}(S_1, S_2, S_3) = \begin{bmatrix} s_1 & s_5 & s_9 \\ s_2 & s_6 & s_{10} \\ s_3 & s_7 & s_{11} \\ s_4 & s_8 & s_{12} \end{bmatrix}.$$

In a four transmit antenna system, an SS is preferably configured to receive the transmission of space-time coding of 4×1, 4×2 or 4×4 configurations ($F_{4\times1}$ $F_{4\times2}$ $F_{4\times4}$, given above being specific examples) with respect to different receive antenna capabilities of the SS classes. These three modes can be applied to the AMC sub-channel and diversity sub-channel. In addition, a fast feedback channel to support the mode selection and adaptation for both the DL and UL is preferably provided.

For two transmit antennas, two transmission modes are preferably supported: space-time transmit diversity and spatial multiplexing.

For a 2×1 configuration the following is an example of a code structure: (STC Code rate=1)

$$F_{2\times1}(S_1, S_2,) = \begin{bmatrix} s_1 & -s_2^* & s_3 & -s_4^* \\ s_2 & s_1^* & s_4 & s_3^* \end{bmatrix},$$

which is the Alamouti space-time transmit diversity (STTD).

For 2×2, 2×4 configuration: (STC Code Rate=2), puncturing the even columns of $F_{2\times1}$ gives:

$$F_{2\times2,2\times4}(S_1, S_2,) = \begin{bmatrix} s_1 & s_3 \\ s_2 & s_4 \end{bmatrix}.$$

This is the spatial multiplexing (a.k.a. BLAST).

In a preferred embodiment, the SS is configured to receive transmission of space-time coding of 2×1, 2×2 or 2×4 configurations, ($F_{2\times1}$, $F_{2\times2,2\times4}$ given above being specific examples) with respect to different receive antenna capabilities of SS classes. These two modes can be applied to the AMC sub-channel and diversity sub-channel. In addition, a fast feedback channel to support mode selection and adaptation for both the DL and UL is preferably provided.

Details of the above codes and of example implementations of the fast feedback channel can be found in Applicant's co-pending U.S. application Ser. No. 11/547,561 filed Apr. 5, 2005, entitled "Methods for Supporting MIMO Transmission in OFDM Applications" hereby incorporated by reference in its entirety.

A first embodiment of the invention provides a code sate 1 OFDM-STBC mapping for 4 Transmit Antennas. To overcome the innate weakness of the above two kinds of codes, a new class of STBC codes is provided which is particularly suited for OFDM applications, although other applications are also contemplated. In OFDM applications, these codes exploit the properties of OFDM and FEC codes to substantially maintain the advantages of Alamouti codes. Furthermore, while the detailed examples given here focus on four antenna applications, they can be easily extended to systems with more than four antennas.

One property of FEC codes is their diversity effect within the code block. With this knowledge, the diversity order on each Quadrature Amplitude modulation (QAM) symbol can be relaxed to within one code block. Code rate 1 orthogonal STBC code designs need to achieve full diversity per QAM symbol, something which is difficult, if not impossible for a larger number of antennas than two. However, this is not necessary when the system is concatenated with soft-decoding based FEC codes.

Therefore, new STBC codes are provided so as to provide a diversity order of two per QAM symbol, while still achieving full diversity with the help of FEC codes. Diversity order two means that each QAM symbol travels through two independently (multipath) fading channels. An example of a new STBC code is presented in Table 4 below (Code-C).

TABLE 4

OFDM-STBC code rate 1 orthogonal code (Code C)
(Antenna Hopping Pattern-1)

|  | Time t | Time (t + T) | Time (t + 2T) | Time (t + 3T) |
|---|---|---|---|---|
| Antenna 1 | $s_1$ | $-s_2^*$ | 0 | 0 |
| Antenna 2 | $s_2$ | $s_1^*$ | 0 | 0 |

TABLE 4-continued

OFDM-STBC code rate 1 orthogonal code (Code C)
(Antenna Hopping Pattern-1)

|  | Time t | Time (t + T) | Time (t + 2T) | Time (t + 3T) |
|---|---|---|---|---|
| Antenna 3 | 0 | 0 | $s_3$ | $-s_4^*$ |
| Antenna 4 | 0 | 0 | $s_4$ | $s_3^*$ |

In Table 5A, another arrangement of an alternative antenna hopping pattern different than Table 4 is shown. Antenna hopping refers to a reordering of the mapping such that the same coding is performed, but that symbols are transmitted by different antennas. For example, in antenna hopping pattern 1 shown in Table 4 above, Antenna 2 is assigned $s_2$ at time t, $s_1^*$ at time t+T and a null assignment at times t+2T and t+3T. However, in antenna hopping pattern 2 in Table 5A below, Antenna 3 is assigned $s_2$ at time t, $s_1^*$ at time t+T and a null assignment at times t+2T and t+3T. It is to be understood that these are two examples of antenna hopping patterns, but there are others that are valid and considered to be within the scope of the invention as well. Table 5B shows a further alternative code mapping.

TABLE 5A

OFDM-STBC code rate 1 orthogonal code (Code C)
(Antenna Hopping Pattern-2)

|  | Time t | Time (t + T) | Time (t + 2T) | Time (t + 3T) |
|---|---|---|---|---|
| Antenna 1 | $s_1$ | $-s_2^*$ | 0 | 0 |
| Antenna 2 | 0 | 0 | $s_3$ | $-s_4^*$ |
| Antenna 3 | $s_2$ | $s_1^*$ | 0 | 0 |
| Antenna 4 | 0 | 0 | $s_4$ | $s_3^*$ |

TABLE 5B

OFDM-STBC code rate 1 orthogonal code (Code C)
(Antenna Hopping Pattern-3)

|  | Time t | Time (t + T) | Time (t + 2T) | Time (t + 3T) |
|---|---|---|---|---|
| Antenna 1 | $s_1$ | $-s_2^*$ | 0 | 0 |
| Antenna 2 | 0 | 0 | $s_3$ | $-s_4^*$ |
| Antenna 3 | 0 | 0 | $s_4$ | $s_3^*$ |
| Antenna 4 | $s_2$ | $s_1^*$ | 0 | 0 |

In a preferred embodiment, multiple different patterns are employed overtime, such as the above-introduced "hopping pattern-1" and "hopping pattern-2". The effect of this is that for each group of symbols $s_1$, $s_2$, $s_3$, $s_4$, the antenna used for $s_1$ for example, changes over time.

Preferably, for the above embodiment, the mappings are used on a per OFDM sub-carrier basis.

With Alamouti codes hopping across the transmit antennas, each QAM symbol has a diversity order of 2; with FEC coding being applied across all the STBC blocks, full diversity order is achieved. The STBC code rate is one, and each code STBC block is orthogonal.

In order to achieve power imbalance for all the transmit antenna in time-domain, from Table 4, it can be noticed that at each instant only two transmitters are transmitting, which means for a constant power of P, each power amplifier (PA) can be designed to have 3 dB more dynamic range than when power balanced codes are used. Here, properties of OFDM can be employed.

Preferably, different patterns are used for different sub-carriers such that an overall power balancing is achieved. This is detailed further below. For the specific example above, a first set of sub-carriers could be used to transmit pattern-1, and a second set of sub-carriers used to transmit pattern-2 at the same time.

Figure 2:
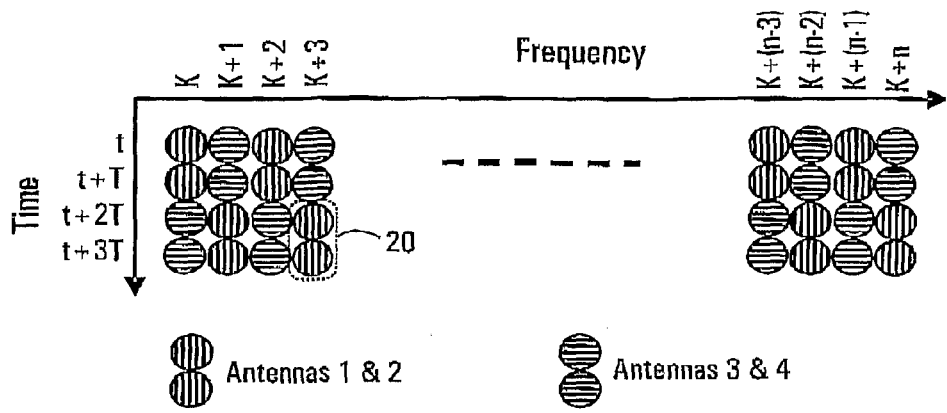
FIG. 2—A schematic diagram representing transmission of STBC blocks on multiple sub-carriers for space-time coding in the time direction.

An OFDM signal has multiple sub-carriers, with each sub-carrier being treated as a flat fading channel. FIG. 2 is an illustrative example of an OFDM signal wherein the sub-carriers are indicated in the frequency domain in columns k, k+1, k+2, k+3 . . . , k+(n−3), k+(n−2), k+(n−1), k+n and time intervals are indicated in the time domain in rows t, t+T, t+2T, t+3T in which STBC blocks 20 are represented.

After IFFT processing occurs, of the type described in the examples of FIGS. 1A-E above, energy of each sub-carriers is superimposed in the time domain, which is then amplified by a respective power amplifier. For sub-carrier k, at time t and t+T, only Antennas 1 and 2 are used for transmission and for sub-carrier k+1, at the same time, only Antenna 3 and 4 are used for transmission. In other words, when looked at from the time domain, all the antennas are transmitting simultaneously, but for different sub-carriers. Thus the average transmitting power per antenna is in fact balanced. This concept is illustrated in FIG. 2.

In FIG. 2, each vertical set of four symbols is transmitted on a single sub-carrier over four transmission intervals, and represents two STBC blocks 20 as defined in Table 4. During the first two transmit intervals, t and t+T, Antennas 1 and 2 transmit an Alamouti block on the sub-carrier, k+1, and during the next two transmit intervals, t+2T and t+3T, Antennas 3 and 4 transmit an Alamouti block. This structure is then repeated for multiple sub-carriers (the horizontal direction in FIG. 2).

In some embodiments, the mapping code on a first set of sub-carriers have the mapping described above and a second set of sub-carriers will have a mapping that is an inverse of the described mapping, that is the location of the Alamouti blocks switch location in the time interval/antenna mapping shown in Tables 4, 5A and 5B. For example, on a first sub-carrier, during the first two transmit intervals, t and t+T, Antennas 1 and 2 transmit an Alamouti block and during the next two transmit intervals, t+2T and t+3T, Antennas 3 and 4 transmit an Alamouti block. On a second sub-carrier, during the first two transmit intervals, t and t+T, Antennas 3 and 4 transmit an Alamouti block and during the next two transmit intervals, t+2T and t+3T, Antennas 1 and 2 transmit an Alamouti block.

In the illustrated example, during a given pair of transmit intervals, all of the odd sub-carriers k, k+2, . . . , k+(n−3), k+(n−1) of one pair of antennas are active, and all of the even sub-carriers k+1, k+3, . . . , k+(n−2), k+n of the other pair of antennas are active. This then reverses for the following pair of transmission intervals. This is only one way to map the single sub-carrier solution onto a set of sub-carriers.

In some embodiments different antennas are used for different sub-carriers (in frequency) to achieve power balancing in the time domain. This is OFDM specific, and is one of the reasons that the new code designs are attractive for practical implementation.

Figure 3:
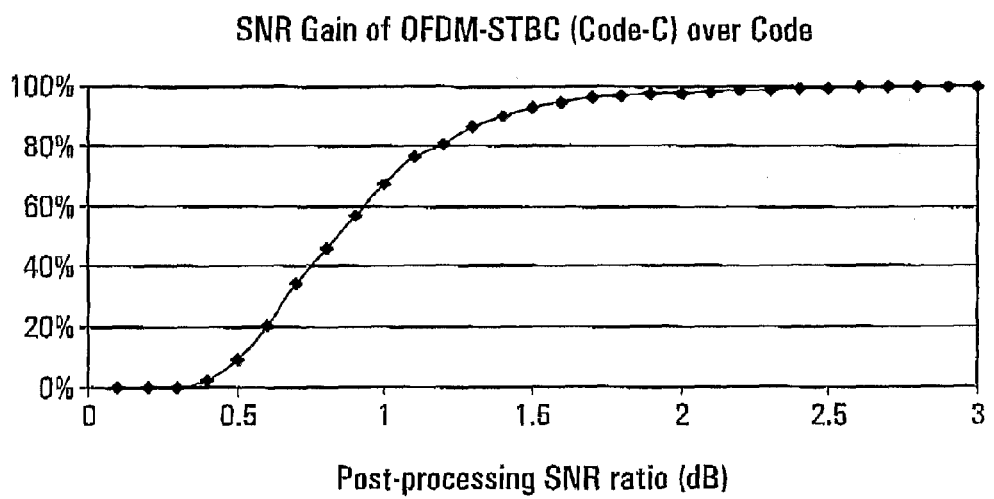
FIG. 3—A graphical illustration of improved performance of a code mapping embodiment provided by the invention compared to an existing code mapping.

A performance advantage in terms of SNR gain of OFDM-STBC Code-C is provided in some embodiments is shown in FIG. 3 over the prior art non-orthogonal, code rate 1 Code-B described previously.

In addition to performance improvements achieved by the new codes, they also possess other additional merits. In some embodiments, the solution is particularly adaptable to OFDM arrangements, but may be suitable for other systems if the resulting power imbalance is acceptable. In some embodiments, such a construction is optimum and can be generalized to 2 n transmit antennas (no other R=1 full diversity code is known to date). This code also utilizes soft-decoding FEC codes to realize full diversity for the whole FEC code block. It is from STBC code-rate 1, full orthogonality of each STBC code block, and full diversity of the whole FEC code block point of view, that optimality is achieved. It was proven that the optimum code with code-rate 1, full orthogonality of each STBC code block, and full diversity for each transmitted symbol does not exist. In some embodiments, since in OFDM applications there are now three dimensions to map the Alamouti structure (essentially a 2 dimensional mapping), the time span for Alamouti mapping can be reduced by alternating the antenna or frequency dimension.

It is noted that one basic assumption of STBC is that the channel does not change from one transmission to the next transmission. For the prior art codes describe above, each QAM symbol is transmitted four times, and this can cause performance loss in the case of mobility, where the basic assumption becomes less and less true. Obviously, the longer the time (or frequency) that elapses between the first and the last transmissions the greater the loss that will be resulted in. The new codes are well suited for this case, for each QAM symbol is only transmitted twice, consecutively.

Figure 4:
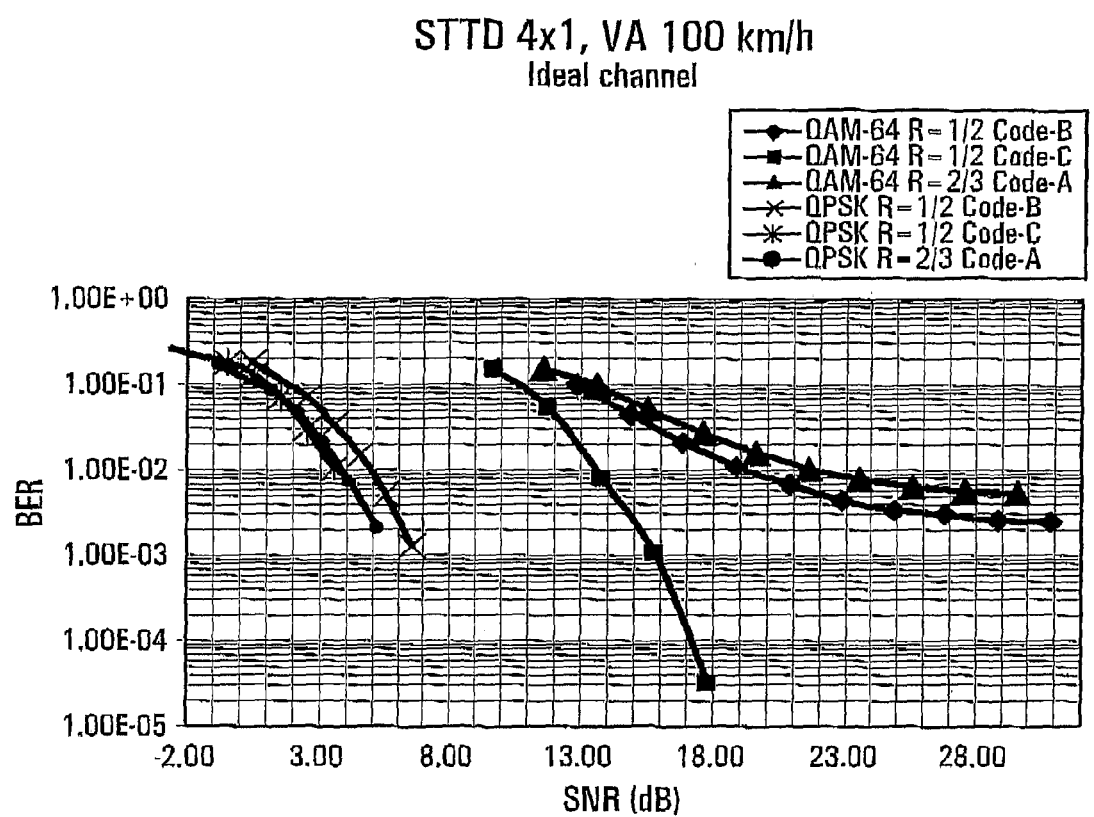
FIG. 4—A graphical illustration of improved high mobility speed performance of a code mapping embodiment provided by the invention compared to an existing code mapping.
Figure 5:
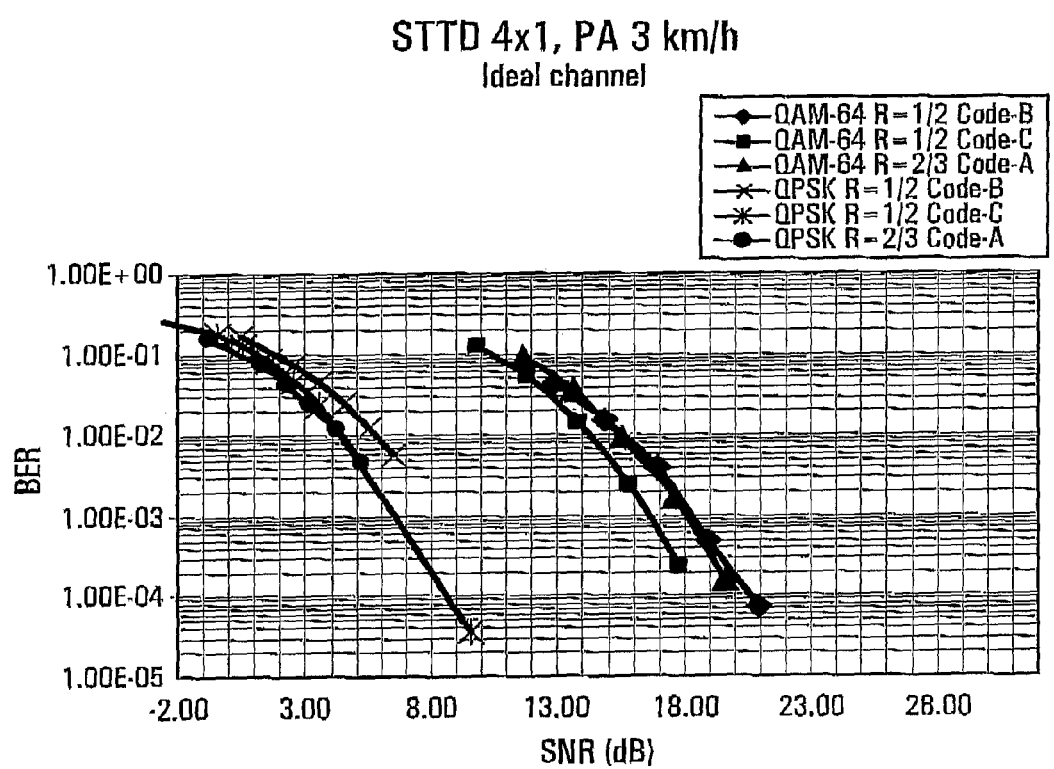
FIG. 5—A graphical illustration of improved low mobility speed performance of a code mapping embodiment provided by the invention compared to an existing code mapping.

FIGS. 4 and 5 show that the performance of embodiments of OFDM-STBC code-C is consistently better than the prior art codes presented above pertaining to performance for high mobility speed and performance for low mobility speed, respectively.

The above described code mappings are examples resulting from of a more general method for mapping a rate one space-time block code for a 2 n antenna transmitter where n>=2. 2 n transmission symbols are transmitted during n pairs of consecutive transmission intervals, by transmitting a respective Alamouti code block containing two transmission symbols on a respective pair of antennas such that all antennas are used during the n pairs of consecutive transmission intervals and only one pair of antennas is active during a given transmission interval. In some embodiments, this method is performed on a per-OFDM sub-carrier basis. Furthermore, the different antenna hopping patterns generally serve to map transmission symbols to the antennas using different patterns for different transmission periods.

Code Rate 2 OFDM-STBC for 4 Transmit Antennas

The fully orthogonal structure for a four antenna transmit case does not exist when the space-time coding rate is 2. However, a sub-optimal code structure can be constructed, as shown in Table 6. Table 7A and Table 7B provide alternative antenna hopping variants. Furthermore, while the detailed examples given here focus on four antenna applications, they can be easily extended to systems with more than four antennas.

TABLE 6

OFDM-STBC code rate 2 orthogonal code (Code-D)
(Antenna Hopping Pattern-1)

|  | Time t | Time (t + T) |
|---|---|---|
| Antenna 1 | $s_1$ | $-s_2^*$ |
| Antenna 2 | $s_3$ | $s_1^*$ |
| Antenna 3 | $s_3$ | $-s_4^*$ |
| Antenna 4 | $s_4$ | $s_3^*$ |

TABLE 7A

OFDM-STBC code rate 2 orthogonal code (Code-D)
(Antenna Hopping Pattern-2)

|  | Time t | Time (t + T) |
|---|---|---|
| Antenna 1 | $s_1$ | $-s_3^*$ |
| Antenna 2 | $s_2$ | $-s_4^*$ |
| Antenna 3 | $s_3$ | $s_1^*$ |
| Antenna 4 | $s_4$ | $s_2^*$ |

TABLE 7B

OFDM-STBC code rate 2 orthogonal code (Code-D)
(Antenna Hopping Pattern-3)

|  | Time t | Time (t + T) |
|---|---|---|
| Antenna 1 | $s_1$ | $-s_4^*$ |
| Antenna 2 | $s_2$ | $-s_3^*$ |
| Antenna 3 | $s_3$ | $s_2^*$ |
| Antenna 4 | $s_4$ | $s_1^*$ |

The above described code mappings are examples resulting from of a more general method for mapping a space-time block code for a 2 n antenna transmitter where n>=2, 2 n transmission symbols are transmitted during two consecutive transmission intervals, by transmitting a respective Alamouti code block containing two transmission symbols on a respective pair of antennas.

The three code rate 2 "hopping pattern" codes can be combined in various different ways to form a code set.

Extension to the Frequency Direction Mapping

The above STBC code construction is provided in the form that maps the Alamouti structure in the time direction, however, such an arrangement can be also mapped onto the frequency direction.

Figure 6:
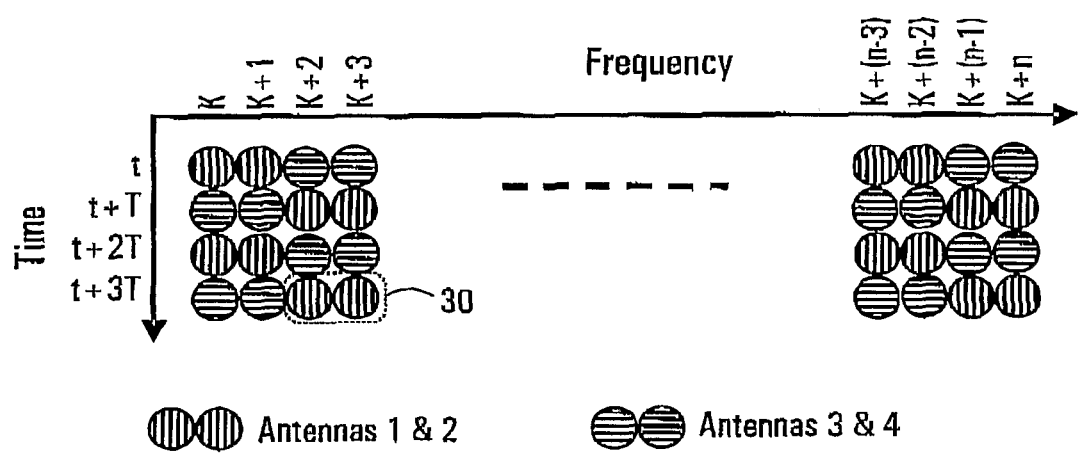
FIG. 6—A schematic diagram representing transmission of STBC blocks on multiple sub-carriers for space-time coding in the time direction.

Similar to the mapping in the time direction, an example of a power balance arrangement for the mapping for the frequency direction is shown in FIG. 6. In FIG. 6, the sub-carriers are indicated in the frequency domain in columns k, k+1, k+2, k+3, . . . , k+(n−3) k+(n−2), k+(n−1), k+n and time intervals are indicated in the time domain in rows t, t+T, t+2T, t+3T in which STBC blocks 30 are represented. During the first two sub-carriers, k and k+1, Antennas 1 and 2 transmit an Alamouti block on the time interval t, and during the next two sub-carriers, k+2 and k+3, Antennas 3 and 4 transmit an Alamouti block. This structure is then repeated for subsequent time intervals (the vertical direction in FIG. 6). In the illustrated example, on a given pair of sub-carriers, during the odd time intervals t, t+2T, . . . , t+(n−1)T one pair of antennas is active, and during the even time intervals t+T, t+3T, . . . , t+mT the other pair of antennas is active. This then reverses for the following pair of sub-carriers. This is only one of many ways to map the single sub-carrier solution onto a set of sub-carriers.

Examples of STBC codes for mapping the Alamouti structure in the frequency direction are listed in Table 8, Table 9A and Table 9B for code rate 1 and Table 10 and Table 11 are for code rate 2.

Furthermore, while the detailed examples given here focus on four antenna applications, they can be easily extended to systems with more than four antennas.

TABLE 8

OFDM-STBC code rate 1 orthogonal code
(Antenna Hopping Pattern-1)

|  | Sub-carrier k | Sub-carrier k + 1 | Sub-carrier k + 2 | Sub-carrier k + 3 |
|---|---|---|---|---|
| Antenna 1 | $s_1$ | $-s_2^*$ | 0 | 0 |
| Antenna 2 | $s_2$ | $s_1^*$ | 0 | 0 |
| Antenna 3 | 0 | 0 | $s_3$ | $-s_4^*$ |
| Antenna 4 | 0 | 0 | $s_4$ | $s_3^*$ |

TABLE 9A

OFDM-STBC code rate 1 orthogonal code
(Antenna Hopping Pattern-2)

|  | Sub-carrier k | Sub-carrier k + 1 | Sub-carrier k + 2 | Sub-carrier k + 3 |
|---|---|---|---|---|
| Antenna 1 | $s_1$ | $-s_2^*$ | 0 | 0 |
| Antenna 2 | 0 | 0 | $s_3$ | $-s_4^*$ |
| Antenna 3 | $s_2$ | $s_1^*$ | 0 | 0 |
| Antenna 4 | 0 | 0 | $s_4$ | $s_3^*$ |

TABLE 9B

OFDM-STBC code rate 1 orthogonal code
(Antenna Hopping Pattern-3)

|  | Sub-carrier k | Sub-carrier k + 1 | Sub-carrier k + 2 | Sub-carrier k + 3 |
|---|---|---|---|---|
| Antenna 1 | $s_1$ | $-s_2^*$ | 0 | 0 |
| Antenna 2 | 0 | 0 | $s_3$ | $-s_4^*$ |
| Antenna 3 | 0 | 0 | $s_4$ | $s_3^*$ |
| Antenna 4 | $s_2$ | $s_1^*$ | 0 | 0 |

The above described code mappings are examples resulting from of a more general method for mapping a rate one space-time block code for a 2 n antenna transmitter where n>=2. 2 n transmission symbols are transmitted on each sub-carrier of a plurality of sub-carriers in an OFDM spectrum, for each transmission interval, on each of n pairs of adjacent OFDM sub-carriers, by transmitting a respective Alamouti code block containing two transmission symbols on a respective pair of antennas such that all sub-carriers are used and only one pair of antennas is active during a given transmission interval for a given sub-carrier. In some embodiments, during a given transmit interval, sub-carriers are active in pairs, alternating between pairs of transmit antennas. Furthermore, the different antenna hopping patterns generally serve to map transmission symbols to the antennas using different patterns for different sub-carriers.

TABLE 10

OFDM-STBC code rate 2 orthogonal code
(Antenna Hopping Pattern-1)

|  | Sub-carrier k | Sub-carrier k + 1 |
|---|---|---|
| Antenna 1 | $s_1$ | $-s_2^*$ |
| Antenna 2 | $s_2$ | $s_1^*$ |
| Antenna 3 | $s_3$ | $-s_4^*$ |
| Antenna 4 | $s_4$ | $s_3^*$ |

TABLE 11A

OFDM-STBC code rate 2 orthogonal code
(Antenna Hopping Pattern-2)

|  | Sub-carrier k | Sub-carrier k + 1 |
|---|---|---|
| Antenna 1 | $s_1$ | $-s_3^*$ |
| Antenna 2 | $s_2$ | $-s_4^*$ |
| Antenna 3 | $s_3$ | $s_1^*$ |
| Antenna 4 | $s_4$ | $s_2^*$ |

TABLE 11B

OFDM-STBC code rate 2 orthogonal code
(Antenna Hopping Pattern-3)

|  | Sub-carrier k | Sub-carrier k + 1 |
|---|---|---|
| Antenna 1 | $s_1$ | $-s_4^*$ |
| Antenna 2 | $s_3$ | $-s_3^*$ |
| Antenna 3 | $s_4$ | $s_2^*$ |
| Antenna 4 | $s_2$ | $s_1^*$ |

The above described code mappings are examples resulting from of a more general method for mapping a space-time block code for a 2 n antenna transmitter where n>=2. 2 n transmission symbols are transmitted for each transmission interval on a pair of adjacent OFDM sub-carriers, by transmitting a respective Alamouti code block containing two transmission symbols on a respective pair of antennas.

Extension to 3 Transmit Antennas

The new codes can be extended to odd numbers of transmit antennae as well. Table 12 and Table 13 are embodiments of the transmit antenna OFDM-STBC code in the time direction and in frequency direction, respectively for an example with three antennas. In these embodiments the code rate is reduced to 2/3, however, however full orthogonality is achieved.

TABLE 12

OFDM-STBC code rate ⅔ orthogonal code
(Antenna Hopping Pattern-1)

|  | Time t | Time (t + T) | Time (t + 2T) | Time (t + 3T) |
|---|---|---|---|---|
| Antenna 1 | $s_1$ | $-s_2^*$ | 0 | 0 |
| Antenna 2 | $s_2$ | $s_1^*$ | $s_3$ | $-s_4^*$ |
| Antenna 3 | 0 | 0 | $s_4$ | $s_3^*$ |

TABLE 13

OFDM-STBC code rate ⅔ orthogonal code
(Antenna Hopping Pattern-2)

|  | Sub-carrier k | Sub-carrier k + 1 | Sub-carrier k + 2 | Sub-carrier k + 3 |
|---|---|---|---|---|
| Antenna 1 | $s_1$ | $-s_2^*$ | 0 | 0 |
| Antenna 2 | $s_2$ | $s_1^*$ | $s_3$ | $-s_4^*$ |
| Antenna 3 | 0 | 0 | $s_4$ | $s_3^*$ |

Code Rate 4 OFDM-STBC for 4 Transmit Antennas

Code rate 4 arrangements become the typical parallel spatial multiplexing known as BLAST. In Table 14 and Table 15 embodiments of a mapping of 4 transmit antenna BLAST in time and in frequency are listed. Furthermore, while the detailed examples given here focus on four antenna applications, they can be easily extended to systems with more than four antennas.

TABLE 14

OFDM-STBC code rate 4 orthogonal code

|  | Time t | Time (t + T) |
|---|---|---|
| Antenna 1 | $s_1$ | $s_5$ |
| Antenna 2 | $s_3$ | $s_6$ |
| Antenna 3 | $s_4$ | $s_7$ |
| Antenna 4 | $s_2$ | $s_8$ |

TABLE 15

OFDM-STBC code rate 4 orthogonal code

|  | Sub-carrier k | Sub-carrier k + 1 |
|---|---|---|
| Antenna 1 | $s_1$ | $s_5$ |
| Antenna 2 | $s_3$ | $s_6$ |
| Antenna 3 | $s_4$ | $s_7$ |
| Antenna 4 | $s_2$ | $s_8$ |

OFDM-STBC Code sets with Antenna Hopping

Various embodiments of 4 antenna transmit OFDM-STBC code sets, are listed in Tables 16A, 16B, and 16C.

TABLE 16A

Code Set Rate 1

|  |  | Sub-carrier k | Sub-carrier k + 1 | Sub-carrier k + 2 | Sub-carrier k + 3 |
|---|---|---|---|---|---|
| Code Rate = 1 | Antenna 1 | $s_1$ | $-s_2^*$ | 0 | 0 |
|  | Antenna 2 | $s_2$ | $s_1^*$ | 0 | 0 |
|  | Antenna 3 | 0 | 0 | $s_3$ | $-s_4^*$ |
|  | Antenna 4 | 0 | 0 | $s_4$ | $s_3^*$ |

TABLE 16B

Code Set Rate 2

|  |  | Time t | Time (t + T) | Time (t + 2T) | Time (t + 3T) | Time (t + 4T) | Time (t + 5T) |
|---|---|---|---|---|---|---|---|
| Code Rate = 2 | Antenna 1 | $s_1$ | $-s_2^*$ | $s_5$ | $-s_7^*$ | $s_9$ | $-s_{12}^*$ |
|  | Antenna 2 | $s_2$ | $s_1^*$ | $s_6$ | $-s_8^*$ | $s_{10}$ | $-s_{11}^*$ |
|  | Antenna 3 | $s_3$ | $-s_4^*$ | $s_7$ | $s_5^*$ | $s_{11}$ | $s_{10}^*$ |
|  | Antenna 4 | $s_4$ | $s_3^*$ | $s_8$ | $s_6^*$ | $s_{12}$ | $s_9^*$ |

TABLE 16C

Code Set Rate 4

|  |  | Time t | Time (t + T) | Time (t + 2T) | Time (t + 3T) |
|---|---|---|---|---|---|
| Code Rate = 4 | Antenna 1 | $s_1$ | $s_5$ | $s_9$ | $s_{13}$ |
|  | Antenna 2 | $s_2$ | $s_6$ | $s_{10}$ | $s_{14}$ |
|  | Antenna 3 | $s_3$ | $s_7$ | $s_{11}$ | $s_{15}$ |
|  | Antenna 4 | $s_4$ | $s_8$ | $s_{12}$ | $s_{16}$ |

Tables 16A, 16B, and 16C are embodiments of code sets for space-time mappings in the time direction. Similarly, the space-time mappings could be expressed in the frequency direction as well, as shown in Tables 16D, 16E, and 16F.

TABLE 16D

Code Set Rate 1

|  |  | Sub-carrier k | Sub-carrier k + 1 | Sub-carrier k + 2 | Sub-carrier k + 3 |
|---|---|---|---|---|---|
| Code Rate = 1 | Antenna 1 | $s_1$ | $-s_2^*$ | 0 | 0 |
|  | Antenna 2 | $s_2$ | $s_1^*$ | 0 | 0 |
|  | Antenna 3 | 0 | 0 | $s_3$ | $-s_4^*$ |
|  | Antenna 4 | 0 | 0 | $s_4$ | $s_3^*$ |

TABLE 16E

Code Set Rate 2

|  |  | Sub-carrier k | Sub-carrier k + 1 | Sub-carrier k + 2 | Sub-carrier k + 3 | Sub-carrier k + 4 | Sub-carrier k + 5 |
|---|---|---|---|---|---|---|---|
| Code Rate = 2 | Antenna 1 | $s_1$ | $-s_2^*$ | $s_5$ | $-s_7^*$ | $s_9$ | $-s_{12}^*$ |
|  | Antenna 2 | $s_2$ | $s_1^*$ | $s_6$ | $-s_8^*$ | $s_{10}$ | $-s_{11}^*$ |
|  | Antenna 3 | $s_3$ | $-s_4^*$ | $s_7$ | $s_5^*$ | $s_{11}$ | $s_{10}^*$ |
|  | Antenna 4 | $s_4$ | $s_3^*$ | $s_8$ | $s_6^*$ | $s_{12}$ | $s_9^*$ |

TABLE 16F

Code Set Rate 4

|  |  | Sub-carrier k | Sub-carrier k + 1 | Sub-carrier k + 2 | Sub-carrier k + 3 |
|---|---|---|---|---|---|
| Code Rate = 4 | Antenna 1 | $s_1$ | $s_5$ | $s_9$ | $s_{13}$ |
|  | Antenna 2 | $s_2$ | $s_6$ | $s_{10}$ | $s_{14}$ |
|  | Antenna 3 | $s_3$ | $s_7$ | $s_{11}$ | $s_{15}$ |
|  | Antenna 4 | $s_4$ | $s_8$ | $s_{12}$ | $s_{16}$ |

A specific Alamouti coded has been used in the examples. It is to be understood that any code having the Alamouti structure can be employed.

Decoder Complexity

A decoder complexity for the 4 transmit STBC of Code-C compared with the prior art codes is listed in Table 17. It can be seen that the complexity of the OFDM-STBC Code-C is 16 times less than the prior art codes.

TABLE 17

Complexity Comparison

|  | Code-A | Code-B | Code-C |  |
|---|---|---|---|---|
|  | Rate = 1 | Rate = 1 | Rate = 1 | Rate = 2 |
| Complexity | 64 | 64 | 4 | 64 |

Space-Time Frequency Mapping for Multiple Transmit Antennas

As described above, the space-time coding can be mapped onto either the time direction or the frequency direction. In other embodiments, a mapping is provided that utilizes both time and frequency mapping, while providing for the entire antenna transmission on each sub-carrier based on the code format. Advantages of this combined time-frequency mapping include minimizing the time-frequency span to ensure the space-time code span is within both a coherent-time and coherent-frequency range. The following examples are provided in particular for 4 transmit antennas, but it is to be understood that the space-time frequency mapping approach can be generalized fox systems with a different number of transmit antennas.

TABLE 18

OFDM-Space-Time Frequency BC code rate ¾

|  | Time t Sub-carrier k | Time t + T Sub-carrier k | Time t Sub-carrier k + 1 | Time t + T Sub-carrier k + 1 |
|---|---|---|---|---|
| Antenna 1 | $s_1$ | $-s_2^*$ | $-s_3^*$ | x |
| Antenna 2 | $s_2$ | $s_1^*$ | x | $s_3^*$ |

TABLE 18-continued

OFDM-Space-Time Frequency BC code rate ¾

| | Time t Sub-carrier k | Time t + T Sub-carrier k | Time t Sub-carrier k + 1 | Time t + T Sub-carrier k + 1 |
|---|---|---|---|---|
| Antenna 3 | $s_3$ | x | $s_1^*$ | $-s_2^*$ |
| Antenna 4 | x | $-s_3$ | $s_2$ | $s_1$ |

TABLE 19

OFDM-Space-Time Frequency BC code rate 1
(Antenna Hopping Pattern-1)

| | Time t Sub-carrier k | Time t + T Sub-carrier k | Time t Sub-carrier k + 1 | Time t + T Sub-carrier k + 1 |
|---|---|---|---|---|
| Antenna 1 | $s_1$ | $-s_2^*$ | 0 | 0 |
| Antenna 2 | $s_2$ | $s_1^*$ | 0 | 0 |
| Antenna 3 | 0 | 0 | $s_3$ | $-s_4^*$ |
| Antenna 4 | 0 | 0 | $s_4$ | $s_3^*$ |

TABLE 20

OFDM-Space-Time Frequency BC code rate 1
(Antenna Hopping Pattern-2)

| | Time t Sub-carrier k | Time t + T Sub-carrier k | Time t Sub-carrier k + 1 | Time t + T Sub-carrier k + 1 |
|---|---|---|---|---|
| Antenna 1 | $s_1$ | $-s_2^*$ | 0 | 0 |
| Antenna 2 | 0 | 0 | $s_3$ | $-s_4^*$ |
| Antenna 3 | 0 | 0 | $s_4$ | $s_3^*$ |
| Antenna 4 | $s_2$ | $s_1^*$ | 0 | 0 |

TABLE 21

OFDM-Space-Time Frequency BC code rate 1
(Antenna Hopping Pattern-3)

| | Time t Sub-carrier k | Time t + T Sub-carrier k | Time t Sub-carrier k + 1 | Time t + T Sub-carrier k + 1 |
|---|---|---|---|---|
| Antenna 1 | $s_1$ | $-s_2^*$ | 0 | 0 |
| Antenna 2 | 0 | 0 | $s_3$ | $-s_4^*$ |
| Antenna 3 | $s_2$ | $s_1^*$ | 0 | 0 |
| Antenna 4 | 0 | 0 | $s_4$ | $s_3^*$ |

TABLE 22

OFDM-Space-Time Frequency BC code rate 2
(Antenna Hopping Pattern-1)

| | Time t Sub-carrier k | Time t + T Sub-carrier k | Time t Sub-carrier k + 1 | Time t + T Sub-carrier k + 1 |
|---|---|---|---|---|
| Antenna 1 | $s_1$ | $-s_2^*$ | $s_5$ | $-s_7^*$ |
| Antenna 2 | $s_2$ | $s_1^*$ | $s_6$ | $-s_8^*$ |
| Antenna 3 | $s_3$ | $-s_4^*$ | $s_7$ | $s_5^*$ |
| Antenna 4 | $s_4$ | $s_3^*$ | $s_8$ | $s_6^*$ |

TABLE 23

OFDM-Space-Time Frequency BC code rate 2
(Antenna Hopping Pattern-2)

| | Time t Sub-carrier k | Time t + T Sub-carrier k | Time t Sub-carrier k + 1 | Time t + T Sub-carrier k + 1 |
|---|---|---|---|---|
| Antenna 1 | $s_1$ | $-s_2^*$ | $s_5$ | $-s_7^*$ |
| Antenna 2 | $s_2$ | $s_1^*$ | $s_6$ | $s_5^*$ |
| Antenna 3 | $s_3$ | $-s_4^*$ | $s_7$ | $-s_8^*$ |
| Antenna 4 | $s_4$ | $s_3^*$ | $s_8$ | $s_6^*$ |

TABLE 24

OFDM-Space-Time Frequency BC code rate 4

| | Time t Sub-carrier k | Time t + T Sub-carrier k | Time t Sub-carrier k + 1 | Time t + T Sub-carrier k + 1 |
|---|---|---|---|---|
| Antenna 1 | $s_1$ | $s_5$ | $s_9$ | $s_{13}$ |
| Antenna 2 | $s_2$ | $s_6$ | $s_{10}$ | $s_{14}$ |
| Antenna 3 | $s_3$ | $s_7$ | $s_{11}$ | $s_{15}$ |
| Antenna 4 | $s_4$ | $s_8$ | $s_{12}$ | $s_{16}$ |

Numerous modifications and variations of the present invention are possible in light of the above teachings. It is therefore to be understood that within the scope of the appended claims, the invention may be practiced otherwise than as specifically described herein.

The invention claimed is:

1. A method for mapping a rate one space-time block code for a 2n antenna transmitter where n=2, the method comprising transmitting 2n transmission symbols in each of a plurality of transmission periods by:
for a first set of sub-carriers, mapping a first set of 2n transmission symbols to a first set of the 2n antennas and mapping a null assignment to a second set of the 2n antennas using a first antenna hopping pattern for a first transmission period of the plurality of transmission periods, the first transmission period comprising a first set of n pairs of consecutive transmission intervals;
for a second set of sub-carriers, mapping a second set of 2n transmission symbols to a third set of the 2n antennas and mapping the null assignment to a fourth set of the 2n antennas using a second antenna hopping pattern for a second transmission period of the plurality of transmission periods;
wherein the first set of the 2n antennas and the fourth set of 2n antennas share a first antenna such that at least a portion of the second set of 2n transmission symbols are transmitted by the first antenna of the first set of the 2n antennas,
wherein the second set of the 2n antennas and the third set of the 2n antennas share a second antenna such that the null assignment is transmitted on the second antenna during both the first transmission period and the second transmission period,
the second transmission period comprising a second set of n pairs of consecutive transmission intervals, wherein the first antenna hopping pattern is different from the second antenna hopping pattern.

2. The method of claim 1 wherein the mapping achieves a diversity order 2 per transmission symbol, the method further comprising performing FEC coding before the mapping such that between the FEC coding and the mapping a full diversity is provided.

3. The method of claim 1 applied in an OFDM transmitter on a per-OFDM sub-carrier basis.

4. The method of claim 1, wherein the first antenna hopping pattern is one of:

|  | Time t | Time (t + T) | Time (t + 2T) | Time (t + 3T) |
|---|---|---|---|---|
| Antenna 1 | $s_1$ | $-s_2^*$ | 0 | 0 |
| Antenna 2 | $s_2$ | $s_1^*$ | 0 | 0 |
| Antenna 3 | 0 | 0 | $s_3$ | $-s_4^*$ |
| Antenna 4 | 0 | 0 | $s_4$ | $s_3^*$, |

|  | Time t | Time (t + T) | Time (t + 2T) | Time (t + 3T) |
|---|---|---|---|---|
| Antenna 1 | $s_1$ | $-s_2^*$ | 0 | 0 |
| Antenna 2 | 0 | 0 | $s_3$ | $-s_4^*$ |
| Antenna 3 | $s_2$ | $s_1^*$ | 0 | 0 |
| Antenna 4 | 0 | 0 | $s_4$ | $s_3^*$ | or

|  | Time t | Time (t + T) | Time (t + 2T) | Time (t + 3T) |
|---|---|---|---|---|
| Antenna 1 | $s_1$ | $-s_2^*$ | 0 | 0 |
| Antenna 2 | 0 | 0 | $s_3$ | $-s_4^*$ |
| Antenna 3 | 0 | 0 | $s_4$ | $s_3^*$ |
| Antenna 4 | $s_2$ | $s_1^*$ | 0 | 0. |

5. The method of claim 3, wherein power balancing is achieved by mapping Alamouti blocks to sub-carriers such that during a given transmission interval, each antenna has a substantially similar number of active sub-carriers.

6. The method of claim 5, wherein the first antenna hopping pattern is one of:

|  | Time t | Time (t + T) | Time (t + 2T) | Time (t + 3T) |
|---|---|---|---|---|
| Antenna 1 | $s_1$ | $-s_2^*$ | 0 | 0 |
| Antenna 2 | $s_2$ | $s_1^*$ | 0 | 0 |
| Antenna 3 | 0 | 0 | $s_3$ | $-s_4^*$ |
| Antenna 4 | 0 | 0 | $s_4$ | $s_3^*$, |

|  | Time t | Time (t + T) | Time (t + 2T) | Time (t + 3T) |
|---|---|---|---|---|
| Antenna 1 | $s_1$ | $-s_2^*$ | 0 | 0 |
| Antenna 2 | 0 | 0 | $s_3$ | $-s_4^*$ |
| Antenna 3 | $s_2$ | $s_1^*$ | 0 | 0 |
| Antenna 4 | 0 | 0 | $s_4$ | $s_3^*$ | or

|  | Time t | Time (t + T) | Time (t + 2T) | Time (t + 3T) |
|---|---|---|---|---|
| Antenna 1 | $s_1$ | $-s_2^*$ | 0 | 0 |
| Antenna 2 | 0 | 0 | $s_3$ | $-s_4^*$ |
| Antenna 3 | 0 | 0 | $s_4$ | $s_3^*$ |
| Antenna 4 | $s_2$ | $s_1^*$ | 0 | 0. |

7. The method of claim 5, wherein the first set of sub-carriers are odd sub-carriers or even sub-carriers and the second set of sub-carriers are the remaining sub-carriers.

8. The method of claim 3, wherein the active antennas of a given sub-carrier alternate every pair of consecutive transmission intervals.

9. A base station, comprising:
a processor configured to map a rate one space-time block code for a 2n antenna transmitter where n=2, wherein the processor transmits 2n transmission symbols in each of a plurality of transmission periods by:
a mapper, for a first set of sub-carriers, mapping a first set of 2n transmission symbols to a first set of the 2n antennas and mapping a null assignment to a second set of the 2n antennas using a first antenna hopping pattern for a first transmission period of the plurality of transmission periods, the first transmission period comprising a first set of n pairs of consecutive transmission intervals;
the mapper, for a second set of sub-carriers, mapping a second set of 2n transmission symbols to a third set of the 2n antennas and mapping the null assignment to a fourth set of the 2n antennas using a second antenna hopping pattern for a second transmission period of the plurality of transmission periods;
wherein the first set of the 2n antennas and the fourth set of 2n antennas share a first antenna such that at least a portion of the second set of 2n transmission symbols are transmitted by the first antenna of the first set of the 2n antennas,
wherein the second set of the 2n antennas and the third set of the 2n antennas share a second antenna such that the null assignment is transmitted on the second antenna during both the first transmission period and the second transmission period, the second transmission period comprising a second set of n pairs of consecutive transmission intervals, wherein the first antenna hopping pattern is different from the second antenna hopping pattern.

10. The base station of claim 9, wherein the mapping achieves a diversity order 2 per transmission symbol, the method further comprising performing FEC coding before the mapping such that between the FEC coding and the mapping a full diversity is provided.

11. The base station of claim 9, wherein the 2n transmission symbols are applied on a per-OFDM sub-carrier basis.

12. The base station of claim 9, wherein the first antenna hopping pattern is one of:

|  | Time t | Time (t + T) | Time (t + 2T) | Time (t + 3T) |
|---|---|---|---|---|
| Antenna 1 | $s_1$ | $-s_2^*$ | 0 | 0 |
| Antenna 2 | $s_2$ | $s_1^*$ | 0 | 0 |
| Antenna 3 | 0 | 0 | $s_3$ | $-s_4^*$ |
| Antenna 4 | 0 | 0 | $s_4$ | $s_3^*$, |

|           | Time t | Time (t + T) | Time (t + 2T) | Time (t + 3T) |
|-----------|--------|--------------|---------------|---------------|
| Antenna 1 | $s_1$  | $-s_2^*$     | 0             | 0             |
| Antenna 2 | 0      | 0            | $s_3$         | $-s_4^*$      |
| Antenna 3 | $s_2$  | $s_1^*$      | 0             | 0             |
| Antenna 4 | 0      | 0            | $s_4$         | $s_3^*$       | or

|           | Time t | Time (t + T) | Time (t + 2T) | Time (t + 3T) |
|-----------|--------|--------------|---------------|---------------|
| Antenna 1 | $s_1$  | $-s_2^*$     | 0             | 0             |
| Antenna 2 | 0      | 0            | $s_3$         | $-s_4^*$      |
| Antenna 3 | 0      | 0            | $s_4$         | $s_3^*$       |
| Antenna 4 | $s_2$  | $s_1^*$      | 0             | 0.            |

13. The base station of claim 11, wherein power balancing is achieved by mapping Alamouti blocks to sub-carriers such that during a given transmission interval, each antenna has a substantially similar number of active sub-carriers.

14. The base station of claim 13, wherein the first antenna hopping pattern is one of:

|           | Time t | Time (t + T) | Time (t + 2T) | Time (t + 3T) |
|-----------|--------|--------------|---------------|---------------|
| Antenna 1 | $s_1$  | $-s_2^*$     | 0             | 0             |
| Antenna 2 | $s_2$  | $s_1^*$      | 0             | 0             |
| Antenna 3 | 0      | 0            | $s_3$         | $-s_4^*$      |
| Antenna 4 | 0      | 0            | $s_4$         | $s_3^*$,      |

|           | Time t | Time (t + T) | Time (t + 2T) | Time (t + 3T) |
|-----------|--------|--------------|---------------|---------------|
| Antenna 1 | $s_1$  | $-s_2^*$     | 0             | 0             |
| Antenna 2 | 0      | 0            | $s_3$         | $-s_4^*$      |
| Antenna 3 | $s_2$  | $s_1^*$      | 0             | 0             |
| Antenna 4 | 0      | 0            | $s_4$         | $s_3^*$       | or

|           | Time t | Time (t + T) | Time (t + 2T) | Time (t + 3T) |
|-----------|--------|--------------|---------------|---------------|
| Antenna 1 | $s_1$  | $-s_2^*$     | 0             | 0             |
| Antenna 2 | 0      | 0            | $s_3$         | $-s_4^*$      |
| Antenna 3 | 0      | 0            | $s_4$         | $s_3^*$       |
| Antenna 4 | $s_2$  | $s_1^*$      | 0             | 0.            |

15. The base station of claim 13, wherein the first set of sub-carriers are odd sub-carriers or even sub-carriers and the second set of sub-carriers are the remaining sub-carriers.

16. The base station of claim 11, wherein active antennas of a given sub-carrier alternate every pair of consecutive transmission intervals.

* * * * *